(12) United States Patent
Deimel et al.

(10) Patent No.: US 9,493,193 B2
(45) Date of Patent: Nov. 15, 2016

(54) LOCKING MECHANISM

(71) Applicant: Rheinmetall MAN Military Vehicle Oesterreich GesmbH, Vienna (AT)

(72) Inventors: Michael Deimel, Adletzberg (AT); Heinz Milchrahm, Zillingdorf (AT); Rudolf Pertlik, Vienna (AT); Martin Leitner, Behamberg (AT); Martin Lang, Wegscheid (DE)

(73) Assignee: Rheinmetall MAN Military Vehicles Oesterreich GesmbH, Vienna (AT)

( * ) Notice: Subject to any disclaimer, the term of this patent is extended or adjusted under 35 U.S.C. 154(b) by 0 days.

(21) Appl. No.: 14/643,000

(22) Filed: Mar. 10, 2015

(65) Prior Publication Data
US 2015/0251710 A1 Sep. 10, 2015

(30) Foreign Application Priority Data
Mar. 10, 2014 (EP) ..................................... 14158543

(51) Int. Cl.
| *B62D 33/07* | (2006.01) |
| --- | --- |
| *E05B 81/18* | (2014.01) |
| *E05B 81/10* | (2014.01) |
| *E05B 63/00* | (2006.01) |

(52) U.S. Cl.
CPC ............. *B62D 33/071* (2013.01); *E05B 81/10* (2013.01); *E05B 81/18* (2013.01); *E05B 83/01* (2013.01); *E05B 2063/0026* (2013.01); *Y10T 403/32254* (2015.01)

(58) Field of Classification Search
CPC ..... B62D 33/071; E05B 81/18; E05B 81/10; E05B 83/01; E05B 2063/0026; Y10T 403/32254

USPC ......................... 296/190.06, 190.04, 190.05
See application file for complete search history.

(56) References Cited

U.S. PATENT DOCUMENTS

| 3,400,970 A * | 9/1968 | Daniluk ............... | B62D 33/071 292/118 |
| --- | --- | --- | --- |
| 3,930,681 A * | 1/1976 | Burton ................. | B62D 33/071 24/494 |
| 4,279,321 A * | 7/1981 | Stone ................... | B62D 33/071 180/89.14 |
| 6,364,043 B1 * | 4/2002 | Lam ..................... | B62D 33/071 180/89.17 |

(Continued)

FOREIGN PATENT DOCUMENTS

| DE | 10 2010 023 427 A1 | 12/2011 |
| --- | --- | --- |
| DE | 10 2010 023 428 A1 | 12/2011 |

*Primary Examiner* — Jason S Morrow
*Assistant Examiner* — E Turner Hicks
(74) *Attorney, Agent, or Firm* — Muncy, Geissler, Olds & Lowe, P.C.

(57) ABSTRACT

A locking mechanism having a lock and a locking bolt for the detachable fixing of a tiltable driver's cab on the chassis of a military motor vehicle. A shared joint (knee) of a knee lever, which has two one-armed lever arms of different lengths, is used as the locking element of the lock, the joint engaging with a corresponding recess of the locking bolt in the locked position of the locking mechanism. The short lever arm of the knee lever is pivotably supported on its end facing away from the knee in a fixed bearing, and the long lever arm of the knee lever is pivotably supported by its end facing away from the knee with the first lever arm of a reversing lever pivotable around a pivot axis. The second lever arm of the reversing lever is connected to a drive for pivoting the reversing lever, so that a pivot motion of the reversing lever induces a motion of the knee of the knee lever into or out of the recess of the locking bolt.

10 Claims, 2 Drawing Sheets

(56) References Cited

U.S. PATENT DOCUMENTS

| | | | | |
|---|---|---|---|---|
| 2004/0119320 A1* | 6/2004 | Albright | ............ | B62D 33/067 296/190.05 |
| 2008/0129056 A1* | 6/2008 | Hernandez | ............ | E05B 63/143 292/98 |
| 2010/0127510 A1* | 5/2010 | Okunaka | ............ | B62D 33/071 292/143 |
| 2012/0065812 A1* | 3/2012 | Yamamoto | ............ | B62D 33/071 701/1 |

* cited by examiner

LOCKING MECHANISM

This nonprovisional application claims priority under 35 U.S.C. §119(a) to European Patent Application No. EP 14158543.0, which was filed on Mar. 10, 2014, and which is herein incorporated by reference.

BACKGROUND OF THE INVENTION

1. Field of the Invention

The present invention relates to a locking mechanism comprising a lock and a locking bolt connectable to the lock. The invention furthermore relates to a use of a locking mechanism of this type for detachably fixing a tiltable driver's cab to the chassis of a motor vehicle, in particular a military vehicle.

2. Description of the Background Art

In motor vehicles with a forward control configuration in which the engine is disposed below the driver's cab, the driver's cab may usually be tilted forward around front bearings for maintenance or repair purposes after the rear driver's cab bearings have been released (DE 10 2010 023 428 A1, DE 10 2010 023 427 A1). The rear driver's cab bearings are secured with the aid of locking mechanisms in the normal driving position of the motor vehicle.

Since the particular locking mechanism may be placed under heavy stress, for example during a collision of the motor vehicle, the locking mechanisms must be constructed in such a way that the lock of the locking mechanism does not disengage with the corresponding striker or locking bolt even in such cases. This applies, in particular, when the motor vehicle is a military vehicle in which an opening of the locking mechanism must be reliably avoided even in the event of a mine explosion.

In military vehicles, in particular, a mine-resistant striker must be provided in addition to the particular locking mechanism to secure the rear driver's cab bearing. This mine-resistant striker may be a bolt device fastened to the chassis of the motor vehicle with the aid of a socket pin, which is inserted through a striker fastened to the driver's cab and fixed in this position.

SUMMARY OF THE INVENTION

It is therefore an object of the present invention to provide a locking mechanism, which may be used to implement a reliable locking function. In particular, the tiltable driver's cab is to be detachably fastenable on the chassis of a military truck with the aid of this locking mechanism, without requiring additional mine-resistant strikers.

An embodiment of the invention is essentially based on the idea of using the joint (knee) of a knee lever having two one-armed lever arms of different lengths as the locking element of the lock of the locking mechanism, the joint engaging with a corresponding recess of the locking bolt in the locked position of the locking mechanism. The short lever arm of the knee lever is pivotably supported on its end facing away from the knee in a fixed bearing, and the long lever arm of the knee lever is pivotably supported by its end facing away from the knee with the first lever arm of a reversing lever pivotable around a pivot axis. The second lever arm of the reversing lever is connected to a drive for pivoting the reversing lever, so that a pivot motion of the reversing lever induces a motion of the knee of the knee lever into or out of the recess of the locking bolt.

Due to an appropriate selection of the lengths of the lever arms of the knee lever and the lever arms of the reversing lever as well as the design of the drive, an additional mine-resistant striker may be dispensed with even in military motor vehicles which are exposed to mine explosions, i.e., the locking mechanism simultaneously performs the function of the mine-resistant striker in motor vehicles of this type.

The drive can have a rod-shaped actuating element, which is connected to the second lever arm of the reversing lever in an articulated manner and is movable from an idle position to an actuating position for the purpose of pivoting the reversing lever. In the idle position of the actuating element, the locking mechanism is in its locked position and is held in this position by a spring-loaded detent acting upon the second lever arm of the reversing lever, so that an unwanted opening of the locking mechanism is prevented (for example, if the drive is defective).

In an exemplary embodiment of the locking mechanism according to the invention, the detent acts upon the end of the second lever arm facing away from the pivot axis of the reversing lever, a tooth-shaped projection of the detent engaging with a tooth-shaped projection of the second lever arm and thereby preventing the second lever arm from pivoting.

The drive may be a hydraulic, pneumatic or electrical drive.

In addition, the lock can have at least one sensor which monitors the closed position of the locking mechanism. This may take place in that the first sensor is disposed on the lock in such a way that it generates a corresponding electrical signal when the lock and the locking bolt have approached each other to the extent that the knee of the knee lever engages with the recess of the locking bolt.

In another exemplary embodiment, the lock can have at least one second sensor which detects the status of the detent.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
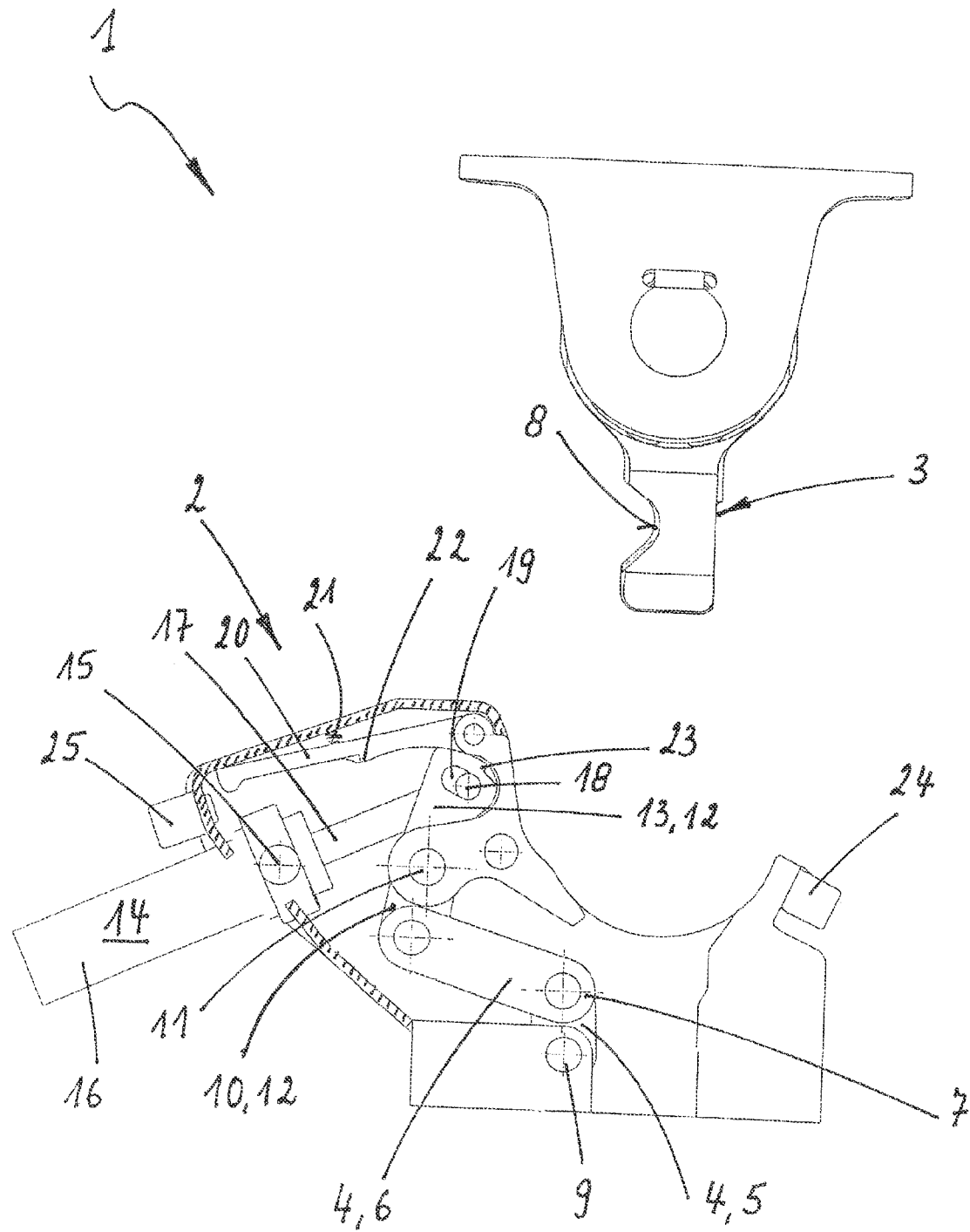
FIG. 1 shows a sectional view of an exemplary embodiment of a locking mechanism according to the invention, including a lock and a locking bolt, in its open position.
Figure 2:
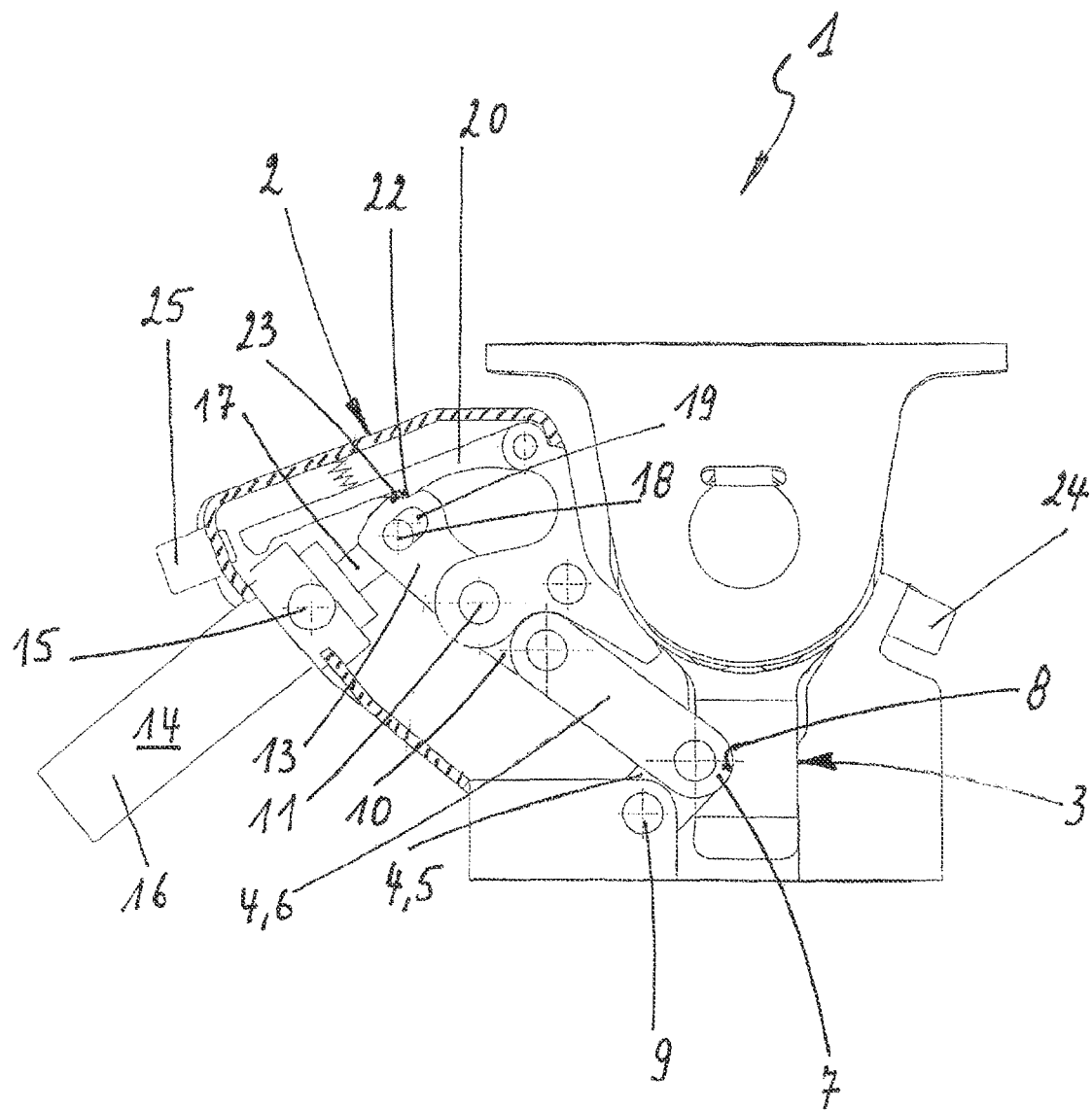
FIG. 2 shows the locking mechanism illustrated in FIG. 1 in its locked position.

In FIGS. 1 and 2, reference numeral 1 identifies a locking mechanism, which includes a lock 2 and a locking bolt 3 which interacts with lock 2. For example, lock 2 may be fastened to the chassis of a military motor vehicle, and locking bolt 3 may be fastened to the driver's cab (as the rear driver's cab bearing) of the corresponding motor vehicle.

Lock 2 includes a knee lever 4 having one-armed lever arms 5, 6 of different lengths, whose shared joint (knee) 7 engages with a recess 8 of locking bolt 3 in the locked position (FIG. 2) of locking mechanism 1 and which is moved out of recess 8 of locking bolt 3 in the opened position (FIG. 1) of locking mechanism 1.

Short lever arm 5 of knee lever 4 is pivotably supported on its end facing away from knee 7 in a fixed bearing 9. Conversely, long lever arm 6 of knee lever 4 is pivotably supported by its end facing away from knee 7 in first lever arm 10 of a reversing lever 12, which is pivotable around a pivot axis 11.

Second lever arm 13 of reversing lever 12 is movably connected to a hydraulic drive 14 for the purpose of pivoting reversing lever 12 from an idle position (FIG. 2) into an actuating position (FIG. 1). For this purpose, hydraulic drive 14 includes a hydraulic cylinder 16, which is pivotable around a rotation axis 15, and a rod-shaped actuating element 17, which is axially movable by hydraulic cylinder 16. This actuating element 17 is connected to second lever arm 13 of reversing lever 12 in an articulated manner, a vertical journal 18 disposed on actuating element 17 engaging with an elongated hole 19 of second lever arm 13.

In the idle position of actuating element 17, locking mechanism 1 is in its locked position (FIG. 2) and is held in this position by a detent 20 acting upon second lever arm 13 of reversing lever 12.

For this purpose, detent 20 is pressed against the end of second lever arm 13 of reversing lever 12 facing away from pivot axis 11 of reversing lever 12, with the aid of a pressure spring 21. A tooth-shaped projection 22 of detent 20 engages with a tooth-shaped projection 23 of second lever arm 13 and thereby prevents second lever arm 13 from pivoting when rod-shaped actuating element 17 is not shifted by a corresponding application of pressure by hydraulic cylinder 16.

If locking mechanism 1 is to be actuated from its locked position (FIG. 2) to its opened position (FIG. 1), drive 14 is activated by a corresponding device (not illustrated).

The hydraulic fluid of hydraulic cylinder 16 then causes pressure to be applied to rod-shaped actuating element 17, so that journal 18 presses tooth-shaped projection 22 upward against pressure spring 21, due to its round shape. Accordingly, the two tooth-shaped projections 22 and 23 are no longer in a form-locked fit, i.e., they are disengaged. Second lever arm 13 may be moved unhindered around pivot axis 11, whereby knee 7 is pulled out of recess 8 of locking bolt 3 with the aid of knee lever 4.

As is apparent from FIGS. 1 and 2, lock 2 contains a first sensor 24, which monitors the closed position of lock 2, and which is disposed for this purpose on lock 2 in such a way that it generates a corresponding electrical signal when lock 2 and locking bolt 3 have approached each other to the extent that knee 7 of knee lever 4 engages with recess 8 of locking bolt 3.

Lock 2 also contains a second sensor 25, which detects the status of detent 20.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A locking mechanism comprising:
   a lock; and
   a locking bolt connectable to the lock; and
   a knee lever arranged in the lock, the knee lever having one-armed lever arms of different lengths whose shared joint engages with a recess of the locking bolt in a locked position of the locking mechanism and which is moved out of the recess of the locking bolt in an opened position of the locking mechanism;
   wherein a short lever arm of the knee lever is pivotably supported on an end facing away from the shared joint in a fixed bearing,
   wherein a long lever arm of the knee lever is pivotably supported by an end facing away from the shared joint with a first lever arm of a reversing lever, which is pivotable around a pivot axis, and
   wherein a second lever arm of the reversing lever is connected to a drive for pivoting the reversing lever so that a pivot motion of the reversing lever induces a motion of the shared joint of the knee lever into or out of the recess of the locking bolt.

2. The locking mechanism according to claim 1, wherein the drive has a rod-shaped actuating element, which is connected to the second lever arm of the reversing lever in an articulated manner and is movable from an idle position into an actuating position for pivoting the reversing lever in the idle position of the actuating element, and wherein the locking mechanism is in its locked position and is held in this position by a spring-loaded detent, which acts upon the second lever arm of the reversing lever.

3. The locking mechanism according to claim 2, wherein the detent acts upon the end of the second lever arm facing away from the pivot axis of the reversing lever, and wherein a tooth-shaped projection of the detent engages with a tooth-shaped projection of the second lever arm and prevents the second lever arm from pivoting.

4. The locking mechanism according to claim 1, wherein the drive is a hydraulic, pneumatic or electric drive.

5. The locking mechanism according to claim 1, wherein the lock contains at least one first sensor, which monitors the locked position of the locking mechanism.

6. The locking mechanism according to claim 5, wherein the first sensor is disposed on the lock such that it generates a corresponding electrical signal when the lock and the locking bolt have approached each other to the extent that the shared joint of the knee lever engages with the recess of the locking bolt.

7. The locking mechanism according to claim 5, wherein the lock contains at least one second sensor, which detects the status of a detent.

8. A use of the locking mechanism according to claim 1 for the detachable fixing of a tiltable driver's cab on the chassis of a commercial vehicle or a military vehicle.

9. A locking mechanism comprising:
   a lock; and
   a locking bolt connectable to the lock;
   a knee lever arranged in the lock, the knee lever having a first lever arm and a second lever arm pivotably connected together at a shared joint; and
   a reversing lever having a first lever arm and a second lever arm pivotably connected together,
   wherein the shared joint engages with a recess of the locking bolt in a locked position of the locking mechanism and moves out of the recess of the locking bolt in an opened position of the locking mechanism;
   wherein the second lever arm of the knee lever is pivotably supported at one end by the first lever arm of the reversing lever, and
   wherein the second lever arm of the reversing lever is connected to a drive for pivoting the reversing lever so that a pivot motion of the reversing lever induces a motion of the shared joint of the knee lever into or out of the recess of the locking bolt.

10. The locking mechanism according to claim 9, wherein the drive has an actuating element, which is connected to the second lever arm of the reversing lever in an articulated manner and is movable from an idle position into an actuating position, and wherein the locking mechanism is in its locked position and is held in this position by a spring-loaded detent, which acts upon the second lever arm of the reversing lever.

* * * * *